B. F. WELCH.
STEERING ATTACHMENT FOR AUTOMOBILE LAMPS.
APPLICATION FILED NOV. 14, 1914.
1,210,026.
Patented Dec. 26, 1916.
2 SHEETS—SHEET 2.
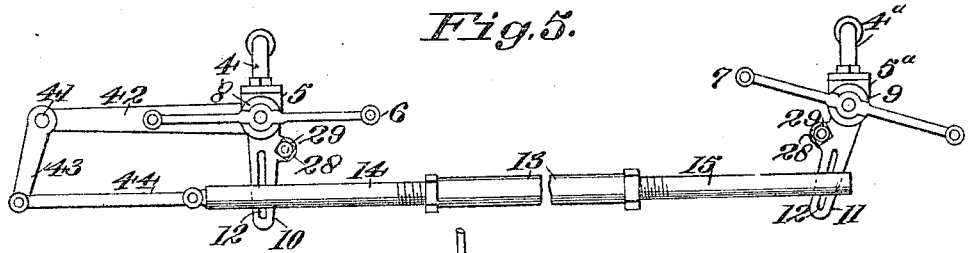
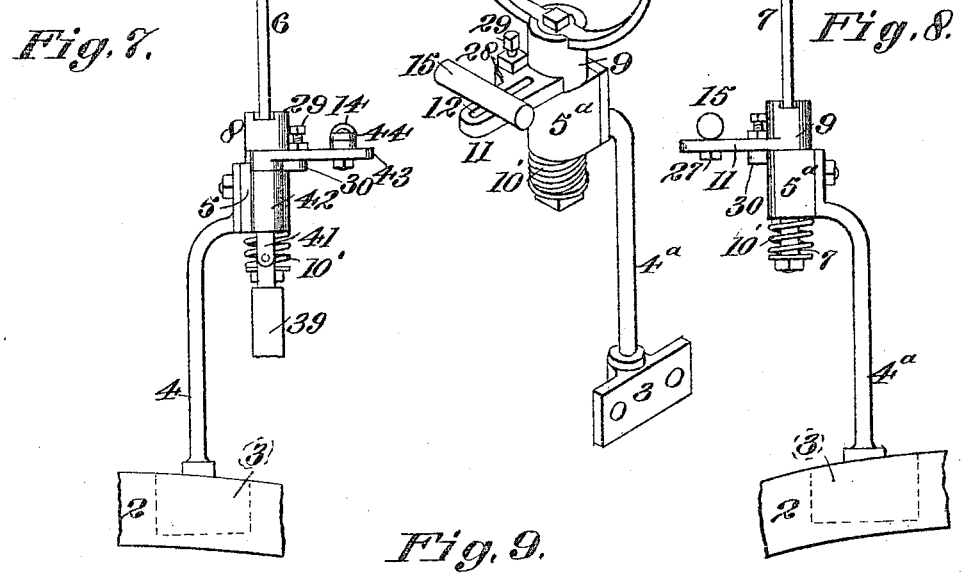
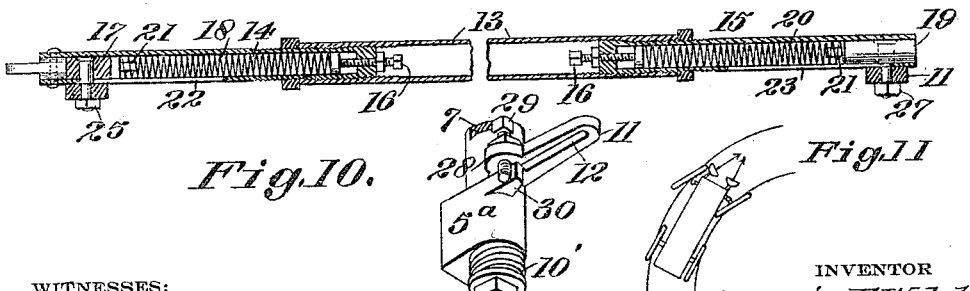
WITNESSES:
Charles Pickles
Thos Costberg
INVENTOR
Benjamin F. Welch.
BY G. H. Strong
ATTORNEY

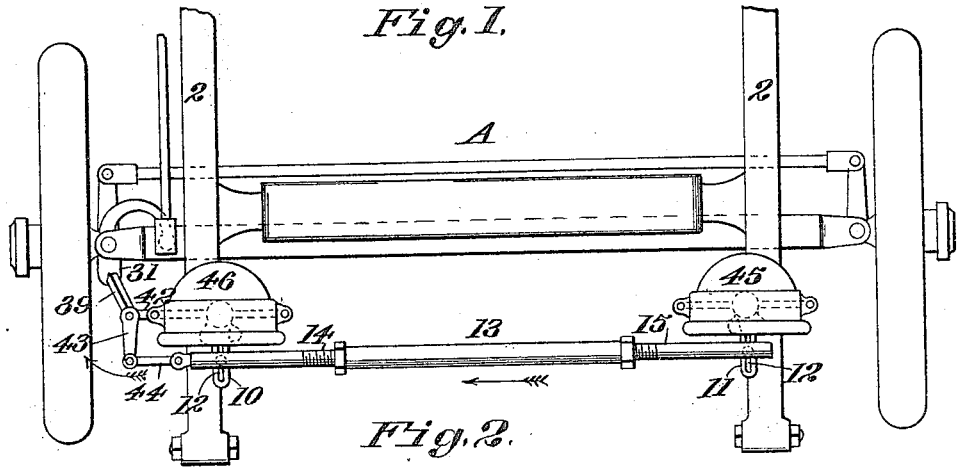
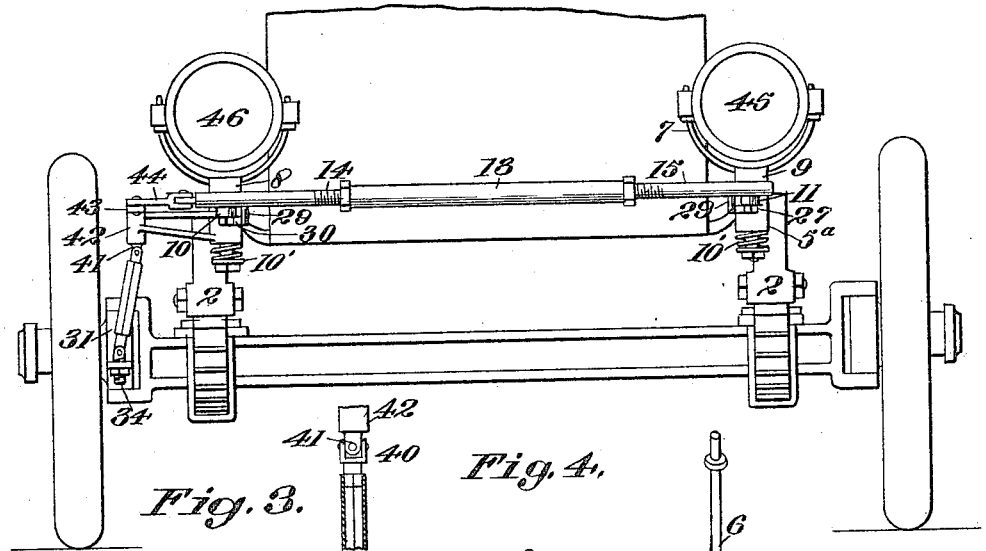
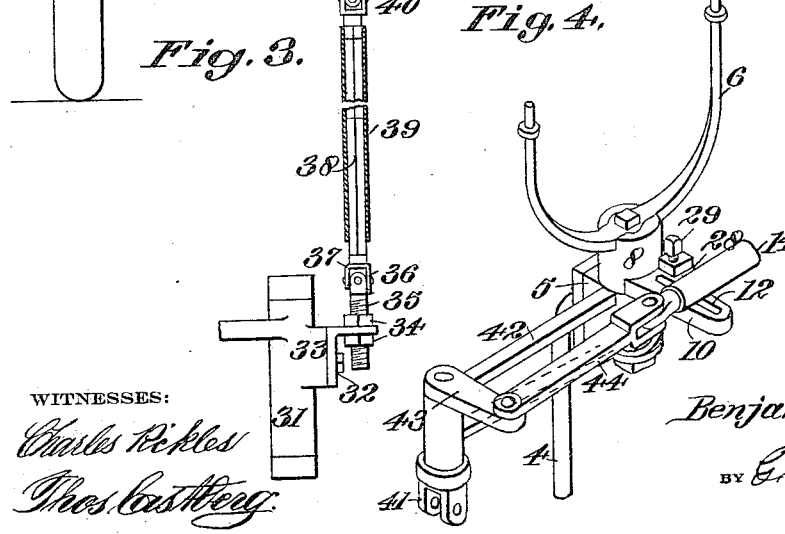

UNITED STATES PATENT OFFICE.

BENJAMIN F. WELCH, OF OAKLAND, CALIFORNIA.

STEERING ATTACHMENT FOR AUTOMOBILE-LAMPS.

1,210,026.  Specification of Letters Patent.  Patented Dec. 26, 1916.

Application filed November 14, 1914. Serial No. 872,100.

*To all whom it may concern:*

Be it known that I, BENJAMIN F. WELCH, a citizen of the United States, residing at Oakland, in the county of Alameda and State of California, have invented new and useful Improvements in Steering Attachments for Automobile-Lamps, of which the following is a specification.

This invention relates to means whereby lamps are connected for operation with the steering mechanism of the automobile, rendering the same dirigible or movable in accordance with the direction of travel of the automobile.

It is one of the objects of the present invention to provide a simple, adjustable, easily applied device which is adapted to connect the lamps and steering mechanism of any car in such a manner that movement of the knuckles is automatically transmitted to turn or direct the lamps in unison so as to throw all the light in the direction in which the car is being steered.

Another object of the invention is to provide an adjustment whereby turning movement of the knuckles will be transmitted to move only the outside lamp when making a turn. The outside lamp or the one on the outer edge of the circle will thus project its light around the turn or in the intended direction of travel, while the inside lamp will project its light straight ahead or in the direction which the car is actually pointing.

Further objects will hereinafter appear.

The invention consists of the parts and the construction and combination of parts as hereinafter more fully described and claimed, having reference to the accompanying drawings, in which—

Figure 1 is a plan view of the front end of an automobile showing the application of the invention. Fig. 2 is a front view of Fig. 1. Fig. 3 is a detail view showing the telescoping universal connection between the steering knuckle and crank 43. Fig. 4 is a detail perspective of the right-hand lamp fork connection. Fig. 5 is a detail plan view of the lamp fork connecting mechanism, showing the left-hand lamp in the turned position. Fig. 6 is a detail perspective showing the left-hand lamp fork connection. Fig. 7 is a side elevation of the right-hand lamp standard and fork. Fig. 8 is a similar view of the left-hand standard and fork. Fig. 9 is a central longitudinal section through the lamp and connecting bar. Fig. 10 is a detail perspective, looking in an upward direction, of one of the lamp sockets and fork stem showing the position of the stop. Fig. 11 is a diagrammatic view showing the projection of light when the car is making a right-hand turn.

More particularly described, A indicates the front end of an automobile, on the chassis frame 2 of which is secured by brackets 3 a pair of lamp standards 4 and 4ª which are provided with sockets 5 and 5ª on their upper ends to receive the stems of the forks 6 and 7. The forks are turnably mounted in the sockets and the upper ends of the fork stems are enlarged as at 8 and 9 respectively to form a hub or shoulder bearing to support each fork. The stem proper on each fork extends down through its socket and is provided with a nut on the lower end between which and the socket proper a spring 10' is interposed.

Formed on the hub section 8 is an outwardly extending crank-arm 10 and similarly formed on hub 9 is a crank-arm 11. Each crank-arm is slotted, as indicated at 12, and the arms are in turn connected by a connecting bar. This connecting bar consists of a central tube section 13, into the outer ends of which are threaded tubes 14 and 15. The inner end of each tube 14 and 15 is closed and each is provided with an adjusting screw 16. Interposed between screw 16 in tube 14 and a sliding bar 17 is a coil spring 18, and interposed between screw 16 in tube 15 and a sliding bar 19 is a coil spring 20; the inner end of each sliding bar being provided with an inwardly projecting stud 21 to form a seat for the spring. The lower sides of the tubes are longitudinally slotted, as indicated at 22 and 23 respectively, and connection is formed between sliding bar 17 and crank-arm 10 by means of a stud bolt 24 which is secured in the sliding bar and extends through the slot in arm 10, being adjustably secured therein by means of a nut 25. Connection is similarly formed between sliding bar 19 and crank-arm 11 by a stud bolt 26 which is carried by bar 19, the lower end of which extends through slot 23 and the slot in arm 11, being adjustably secured therein by means of a nut 27. Each crank-arm is also provided with an inwardly extending lug 28 in which is mounted a stop screw 29 and each socket 8 and 9 is in turn provided with an outwardly extending stop lug 30 with which the screws 29 will engage for purposes hereinafter to be described.

One end of the lamp connecting bar is connected with the right-hand steering knuckle of the car by the following means: Referring to Figs. 1, 2 and 3, 31 indicates the right-hand steering knuckle, and suitably secured to same, as at 32, is a bracket 33 to which is adjustably secured, by a pair of jam-nuts 34, a bolt 35, the upper end of which is forked, as at 36, and pivotally mounted and connected to said fork, as at 37, is a square shaft 38 which telescopes into a square tube 39. The upper end of tube 39 is pivotally secured, as at 40, in the lower forked end of a shaft 41 turnably mounted in the bracket bearing extension 42 formed on the lamp socket 5. Secured on the upper end of shaft 41 is a crank-arm 43, and pivotally connecting said arm with the sliding bar 17 is a link 44.

The connections just described between steering knuckle 31 and the sliding bar 14 provides a means whereby the turning movement of the knuckle, when rounding a curve, is transmitted to the lamp connecting bar to swing the lamps to one side or the other in unison or independently of each other. The telescoping shaft connection formed by tube 39 and shaft 38 forms a flexible connection between the lamp socket and the steering knuckle which permits the chassis frame to swing and rise in the usual manner without disturbing or interfering with the operation of the connected parts.

The lamp steering attachment here provided permits both lamps to be turned in unison with the front wheels of the car when rounding a curve and also permits one lamp to be moved independently of the other.

The operation will be as follows: If it is desired to transmit movement from the steering knuckle to turn both lamps in unison, it is accomplished by turning the stop screws 29 in an upward direction until they will be thrown out of engagement with the stop lugs 30 formed on the respective sockets 5 and 5ª. Turning movement of the front wheels or knuckles will thus be transmitted through the telescoping shaft sections 38 and 39 to shaft 41 and through crank-arm 43 and link 44 to the lamp connecting bar which is adjustably secured by stud bolts 24 and 26 to the lamp fork crank-arms 10 and 11. The tension of the springs 18 and 20 is in this instance sufficient to hold the sliding bars 17 and 19 in the outer ends of their tubes 14 and 15, causing the whole bar to move as a solid or rigid unit. Movement is thus transmitted to both lamp forks and will thus cause them to swing in unison throwing the light around the turn in the usual manner. If it is desired to turn only one lamp at a time when rounding a curve, it is accomplished by screwing the stop screws 29 in a downward direction until they are in a position where they will engage with stop lugs 30. The operation will then be as follows: Referring to Figs. 1 and 5, supposing the car is turning in the right-hand direction. Movement will then be transmitted from the steering knuckle to swing crank-arm 43 in the direction of arrow $a$, or, in other words, pull the lamp connecting bar in the direction of arrow $b$. This will cause the left-hand lamp 45 to swing into the position indicated in Fig. 5, while the right-hand lamp 46 will remain stationary. Lamp 45 would necessarily have to turn in this instance within its socket, as the sliding bar 19 forms a rigid connection between crank-arm 11 and the connecting bar as stud pin 26 is in the outer position or in the end of slot 23. The stop screw 29 on crank-arm 11 will not interfere with the turning of the lamp as it is mounted on the inside of the crank-arm and will consequently move away from the stop lug on the socket. The stop screw 29, carried by lamp 46 or crank arm 10′, will, when the connecting bar moves in the direction of arrow $b$, hold the crank arm 10 from turning. The sliding bar 17 being directly connected with the arm 10 will thus remain stationary while tube 14 will slide over same causing spring 18 to be compressed. A yielding or flexible connection is thus formed between each sliding bar and its respective tube by which a positive connection is made in one direction and a yielding connection in the opposite direction. The passing of the automobile around a right-hand turn will thus cause the left-hand lamp 45 to turn in a right-hand direction, or, in other words, project its light around the curve while the right-hand lamp will remain stationary and project its light straight ahead. Turning movement of the front wheels in the opposite direction or when the car is making a left-hand turn will be transmitted to turn lamp 46 in a left-hand direction while lamp 45 will remain stationary, as stop screw 29 will engage with the stop lug 30 on the socket and hold the crank-arm 11 from turning. Tube 15 will thus slide over the sliding bar 19 and this being permitted to remain stationary by reason of the yielding spring and the length of slot 23, the tension of said spring being adjusted by the set-screw 16.

The provision of slots 12 in crank arms 10 and 11 permits the connecting bar to be adjustably secured thereto by means of nuts 25 and 27. If it is desired to move or throw the lamps to a great angle when rounding a turn, it is accomplished by moving the connecting bar inwardly on each arm anl locking it in that position. If it is desired to secure a smaller angular projection of light or turning movement of each lamp, it is accomplished by moving the connecting bar outwardly with relation to each arm and securing it in this position.

The advantage of the independent turning movement of one lamp with relation to the other can be better illustrated in the following manner: Assuming that a driver in the mountains desires to make a projecting point of hill, the road taking a left-hand turn around it. When the turn is intended and the front wheels have started, the right-hand lamp turns to the left, illuminating the intended direction of travel, while the left-hand lamp projects straight ahead and lights the edge of the cliff or road where the vehicle would go were it not steered otherwise. This projection of the light straight ahead and around the turn at the same time does away with the danger of getting too close to the edge of the road. Applying this to city streets, when rounding a left-hand turn the right-hand light would again show the intended direction of travel to be clear of vehicles. pedestrians, etc., while the left-hand light shows what would be ahead in a straight direction, for instance any other oncoming vehicle or the like.

The materials and finish of the several parts of the device are such as the experience and judgment of the manufacturer may dictate.

I wish it understood that various changes in form, proportions and details of construction may be resorted to within the scope of the appended claims and that I do not wish to limit myself to the specific design and construction here shown.

Having thus described my invention, what I claim and desire to secure by Letters Patent is—

1. The combination with the steering mechanism of a vehicle of a pair of lamp forks turnably mounted thereon, a crank arm secured to each fork, a bar connecting said crank arms, said bar comprising a central tubular member, tubes adjustable in each end of said central member, and springs carried in said tubes forming a yielding connection between said arms and said bar, means for connecting said bar to the steering mechanism to move it longitudinally, and independently adjustable means carried by each fork for locking either crank arm against movement in one direction.

2. The combination with the steering mechanism of a vehicle, of a lamp supported for turning movements adjacent each side of the vehicle, connections between said mechanism and lamps to cause the lamps to turn simultaneously in the same direction that the vehicle is turned, and means adjustable at will to render the movement imparted to said lamps from the steering mechanism effective to turn one lamp only when the vehicle turns in one direction and the other lamp only when the vehicle turns in the other direction.

3. The combination with the steering mechanism of a vehicle, of a pair of lamps turnably mounted thereon, means connecting the steering mechanism with the lamps for simultaneously turning both lamps in unison therewith, and means for limiting the movement of said lamps whereby when the vehicle is turned to the left the right hand lamp will turn to the left and the left hand lamp will remain stationary to project its light straight ahead, and when the vehicle is turned to the right the left hand lamp will turn to the right and the right hand lamp will remain stationary.

4. The combination with the steering mechanism of a vehicle, of a pair of lamp forks turnably mounted thereon, a lamp in each fork, a crank arm secured to each fork, a bar connecting said crank arms, a yielding connection formed between each crank arm and bar, means for transmitting movement from the steering mechanism to move the bar longitudinally for simultaneously turning said lamps when the vehicle is turned, and means for locking either of the crank arms against movement in one direction.

5. The combination with the steering mechanism of a vehicle, of a pair of lamp forks turnably mounted thereon, a lamp in each fork, a crank arm secured to each fork, a bar connecting said crank arms, a yielding connection formed between each crank arm and the bar, means for transmitting movement from the steering mechanism to move the bar longitudinally, and selective means for locking either crank arm against movement in one direction.

In testimony whereof I have hereunto set my hand in the presence of two subscribing witnesses.

BENJAMIN F. WELCH.

Witnesses:
IRVINE SINNETT,
W. W. HEALEY.

Copies of this patent may be obtained for five cents each, by addressing the "Commissioner of Patents, Washington, D. C."